United States Patent
Zhang et al.

(10) Patent No.: US 6,324,491 B1
(45) Date of Patent: Nov. 27, 2001

(54) METHOD FOR DETERMINING A HEAT SOURCE MODEL FOR A WELD

(75) Inventors: Jinmiao Zhang, Dublin, OH (US); Yi Dong, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/620,877

(22) Filed: Jul. 21, 2000

Related U.S. Application Data

(60) Provisional application No. 60/157,244, filed on Oct. 1, 1999.

(51) Int. Cl.[7] .................................................. B23K 5/10
(52) U.S. Cl. ..................... 703/7; 219/130.01; 219/130.02
(58) Field of Search ..................... 374/1, 43; 219/130.01, 219/130.21; 228/103; 703/2, 6, 7; 700/145, 299

(56) References Cited

U.S. PATENT DOCUMENTS

| | | | |
|---|---|---|---|
| 4,594,497 | * | 6/1986 | Takahashi et al. ............... 219/130.21 |
| 5,291,423 | * | 3/1994 | Roosli .................................. 364/552 |
| 5,407,119 | * | 4/1995 | Churchill et al. ................. 228/124.5 |
| 5,552,575 | * | 9/1996 | Doumanidis ..................... 219/124.34 |
| 5,595,670 | * | 1/1997 | Mombo-Caristan ............ 219/121.64 |
| 5,625,575 | * | 4/1997 | Goyal et al. ......................... 364/578 |
| 5,847,389 | * | 12/1998 | Mertins et al. ..................... 250/222.2 |
| 5,963,459 | * | 10/1999 | Burnett et al. ........................ 364/578 |
| 6,064,810 | * | 5/2000 | Road et al. ...................... 395/500.43 |
| 6,074,504 | * | 6/2000 | Yu et al. .............................. 156/137 |
| 6,161,080 | * | 12/2000 | Aouni-Ateshian et al. .......... 703/11 |

FOREIGN PATENT DOCUMENTS

0512972A2   11/1992   (EP).
10-146689   6/1998   (JP).

OTHER PUBLICATIONS

A Study on the Effect ofContact Tube–to–Workpiece Distance on Weld Pool Shape in Gas Metal Arc Welding, Kim et al. May 1995.
An Analytical Solution to Predict the Transient Temperature Distribution in Fillet Arc Welds, S.K. Jeong, et al. Jun. 1997.
Weld Heat–Affected Zone in Ti–A61–4V Alloy, Part I–Computer Simulation of the Effect of Weld . . . variable on the Thermal Cycle in the HAZ, A.K. Shah, et al. Sep. 1995.
Dr. Rosenthal, D., "Mathematical Theory of Heat Distribution During Welding and Cutting . . . ", Welding Res. Supplement, No Date.
Goldak, John et al., "A New Finite Element Model Heat Sources . . . " Metallurgical Trans. B, vol. 15B, p. 299, Jun. 1984.

\* cited by examiner

Primary Examiner—Diego Gutierrez
Assistant Examiner—Gail Verbitsky
(74) Attorney, Agent, or Firm—Steven D. Lundquist

(57) ABSTRACT

A method for determining a heat source model for a weld. The method includes the steps of determining a double elliptical distribution of the heat density of the weld, modifying the double elliptical distribution as a function of a profile geometry of the weld, and determining the heat source model as a function of the modified double elliptical distribution.

9 Claims, 2 Drawing Sheets

Fig-4-
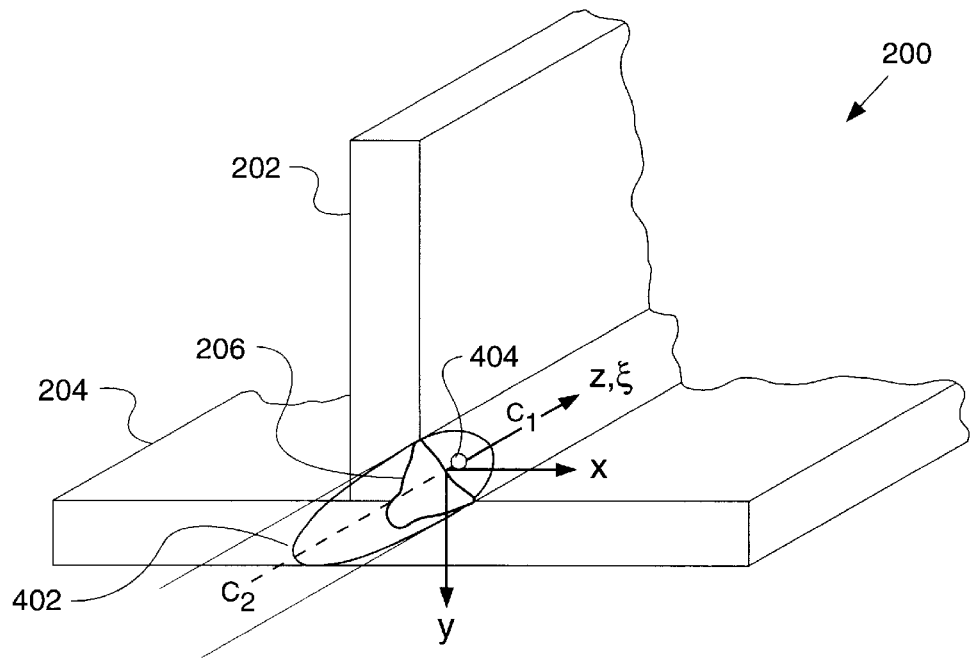
Fig-5-
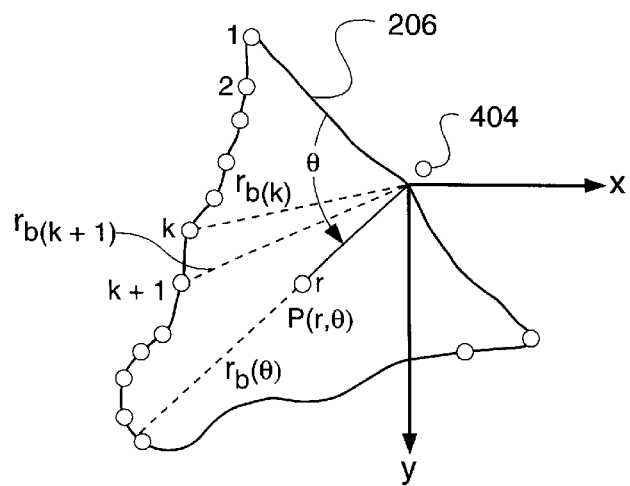

METHOD FOR DETERMINING A HEAT SOURCE MODEL FOR A WELD

This application claims the benefit of prior provisional patent application Serial No. 60/157,244 filed Oct. 1, 1999.

TECHNICAL FIELD

This invention relates generally to a method for determining a heat source model for a weld and, more particularly, to a method for determining a heat source model for an arbitrarily shaped weld profile.

BACKGROUND ART

It is imperative when welding a joint between two metals, for example, in gas metal arc welding, to minimize distortions and residual stresses, and to maximize the strength of the welded joint and the surrounding structure.

One method for determining the residual stress of a weld joint is to model the stress based on a modeled weld heat source. For example, a common and very popular method for modeling a weld heat source is known as a double elliptical heat source model, disclosed by Goldak et al. (Goldak) in a paper entitled, *A New Finite Element Model for Welding Heat Sources* (Metallurgical Transactions, Volume 15B, June, 1984, pages 299–305).

The model disclosed by Goldak, however, may not be directly applied to an arbitrarily shaped weld profile. For example, welding procedures, parameters of the materials, and joint types, e.g., T-fillet joints, butt joints, lap joints, and the like, result in weld heat sources that are no longer elliptical. Therefore, it would be desired to incorporate the weld profile geometry of the joint into the heat source model to improve the accuracy of the model.

The present invention is directed to overcoming one or more of the problems as set forth above.

DISCLOSURE OF THE INVENTION

In one aspect of the present invention a method for determining a heat source model for a weld is determined. The method includes the steps of determining a double elliptical distribution of the heat density of the weld, modifying the double elliptical distribution as a function of a profile geometry of the weld, and determining the heat source model as a function of the modified double elliptical distribution.

BRIEF DESCRIPTION OF THE DRAWINGS

FIG. 4 is a diagrammatic illustration of a modified double ellipsoid heat source model of the T-fillet joint of FIG. 2; and FIG. 5 is a diagrammatic illustration of a cross section of the weld portion of the T-fillet joint of FIG. 4.

BEST MODE FOR CARRYING OUT THE INVENTION

The present invention provides a method for determining an enhanced heat source model for a weld by incorporating the weld profile geometry in the mathematical formulation for a double elliptical heat source model. The invention is described with reference to the accompanying drawings and illustrations.

The double elliptical heat source model is an advanced weld heat source model. The double elliptical heat source model assumes that the heat input from the weld arc is distributed in a volume with double ellipsoidal geometry. The major advantage of the double elliptical heat source model over other surface or spherical models is that it offers more flexibility in modeling weld penetration due to arc digging and stirring.

Figure 1:
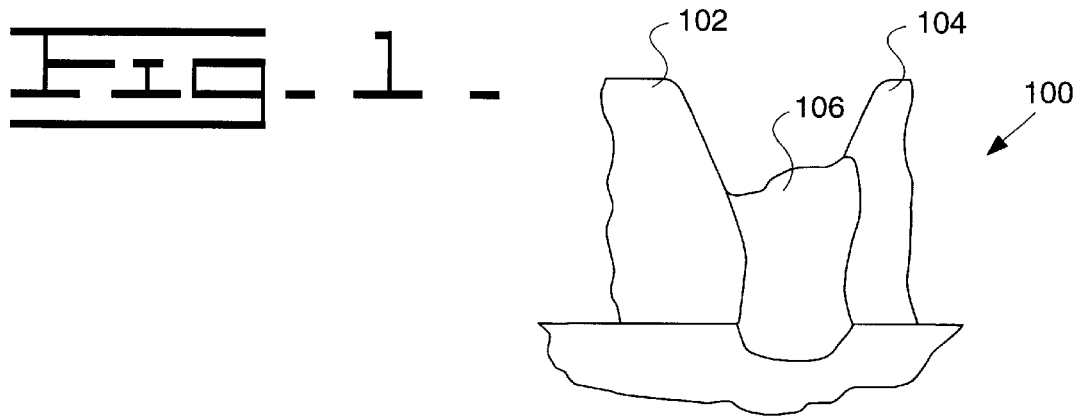
FIG. 1 is a diagrammatic illustration of a butt joint.
Figure 2:
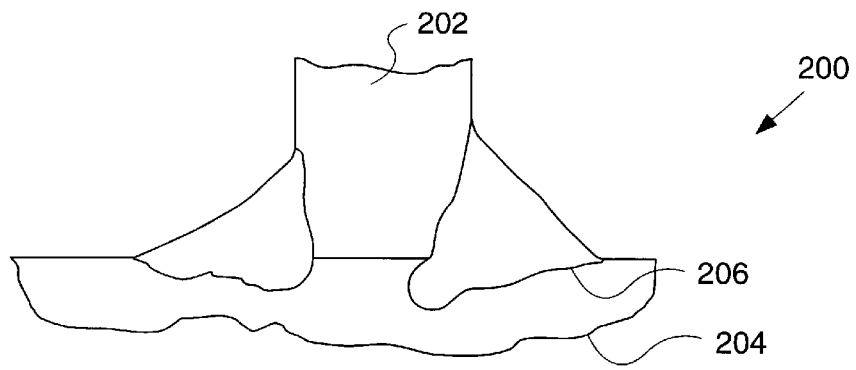
FIG. 2 is a diagrammatic illustration of a T-fillet joint.
Figure 3:
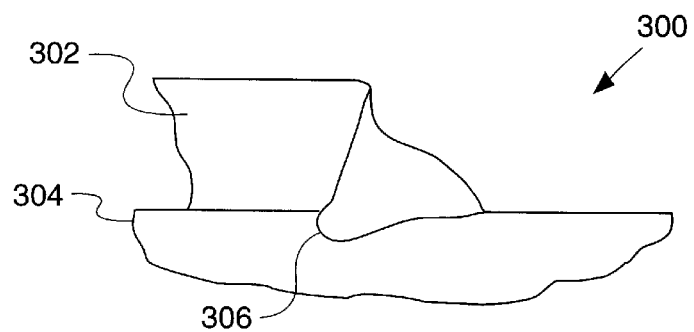
FIG. 3 is a diagrammatic illustration of a lap joint.

However, typical weld cross section profiles are not elliptical in shape. For example, with reference to FIGS. 1–3, exemplary weld profiles are shown for some commonly used welds. FIG. 1 illustrates a half-filled butt joint 100, in which a first piece 102 is attached to a second piece 104 by means of a butt joint weld 106. FIG. 2 displays a T-fillet joint 200, in which a first piece 202 is attached to a second piece 204 by means of a T-fillet weld 206. In like manner, FIG. 3 illustrates a lap joint 300, in which a first piece 302 is attached to a second piece 304 by means of a lap joint weld 306. It is to be understood that the weld joints of FIGS. 1–3 are merely examples of weld joints that may be used with the present invention. Virtually any type of weld joint used may benefit from use of the present invention.

Referring now to FIGS. 4 and 5, the T-fillet joint 200 of FIG. 2 is shown in greater detail.

The heat source model assumes the following Gauss distribution for the heat density distribution in the weld pool:

$$q(\xi, r, \theta) = q_{max} e^{-k\left(\frac{\xi}{c}\right)^2} e^{-k\left(\frac{r}{r_b(\theta)}\right)^2} \quad \text{(Equation 1)}$$

where $q_{max}$ is the maximum heat density at an arc center 404 of the T-fillet joint weld; $\xi$ is a moving coordinate in the welding direction, i.e., $\xi=z-vt+z_0$; $v$ is an arc traveling speed; $z_0$ is the distance from the arc starting position to the cross sectional plane of interest for a two dimensional cross sectional model, or to the plane $z=0$ for a three dimensional model; $r_b(\theta)$ is the distance from the heat center to points 1, 2, ... k, k+1, ... on the boundary of the weld profile; $r$ and $\theta$ are local polar coordinates at the weld cross section; $c$ is the semi-axis of the weld pool in the welding direction; and $k$ is a parameter known as a heat concentration coefficient used to determine heat density at the boundary of weld cross section, i.e., $$k = \ln\left(\frac{q_{max}}{q_b}\right)\bigg|_{\xi=0}.$$

It is assumed, with reference to FIG. 4, that the heat source model 402 forms double elliptical distributions for the heat density in the welding, i.e., longitudinal, direction with front semi-axis $c_1$ and rear semi-axis $c_2$. Therefore, $$q_1(\xi, r, \theta) = q_{max} e^{-k\left(\frac{\xi}{c_1}\right)^2} e^{-k\left(\frac{r}{r_b(\theta)}\right)^2} \quad \text{for } \xi \geq 0 \quad \text{(Equation 2)}$$

and $$q_2(\xi, r, \theta) = q_{max} e^{-k\left(\frac{\xi}{c_2}\right)^2} e^{-k\left(\frac{r}{r_b(\theta)}\right)^2} \quad \text{for } \xi < 0. \quad \text{(Equation 3)}$$

The continuity condition for the heat density at $\xi=0$ $$q_1(0, r, \theta) = q_2(0, r, \theta) \quad \text{(Equation 4)}$$

holds from Equations 2 and 3.

The total heat input in the model, preferably in Joules per second, can be related to the welding parameters as follows:

$$Q = \eta VI = \int_0^\infty \int_0^{\theta_n} \int_0^\infty q_1(\xi, r, \theta) r d\theta dr d\xi + \quad \text{(Equation 5)}$$

$$\int_0^\infty \int_0^{\theta_n} \int_0^\infty q_2(\xi, r, \theta) r d\theta dr d\xi$$

$$= q_{max} \frac{\sqrt{\pi}(c_1 + c_2)}{4k\sqrt{k}} \int_0^{\theta_n} r_b^2(\theta) d\theta$$

$$= q_{max} \frac{\sqrt{\pi}(c_1 + c_2)}{4k\sqrt{k}} \Psi$$

where $\Psi$ is a function of weld profile geometry only. Preferably, the weld profile can be represented by a discrete number of points (1, 2, ... k, k+1, ...) as shown in FIG. 5. The function $\Psi$, in the preferred embodiment, is expressed as $$\Psi = \sum_{k=2}^n \int_{\theta_{k-1}}^{\theta_k} r_b^2(\theta) d\theta \quad \text{(Equation 6)}$$

$$= \sum_{k=2}^n (2A_k) = 2A_w$$

where $A_w$ is the area of the fusion region. From Equations 5 and 6, it may be determined that $$q_{max} = \frac{2k\sqrt{k}}{\sqrt{\pi} A_w(c_1 + c_2)} \eta VI. \quad \text{(Equation 7)}$$

In the special case of an elliptical weld cross section, $A_w = \pi ab/2$, and therefore $$q_{max} = \frac{4k\sqrt{k}}{\pi\sqrt{\pi} ab(c_1 + c_2)} \eta VI. \quad \text{(Equation 8)}$$

In the thermal analysis, the initial nodal temperature in the weld area is often assigned to be the melting temperature. Thus, the heat density distribution becomes $$q(\xi, r, \theta) = \frac{2k\sqrt{k}(\eta VI - Q_w)}{\sqrt{\pi} A_w(c_1 + c_2)} e^{-k\left(\frac{\xi}{c}\right)^2} e^{-k\left(\frac{r}{r_b(\theta)}\right)^2} \quad \text{(Equation 9)}$$

where $$Q_w = \rho A_w v \int_{T_o}^{T_m} \bar{c} \, dT \quad \text{(Equation 10)}$$

and $\bar{c}$ is the temperature dependent specific heat of the weld material.

INDUSTRIAL APPLICABILITY

The present invention is an enhanced welding heat source model that can be used for an arbitrarily-shaped fusion profile. The model is based on a modification of a double elliptical heat source model with an explicit representation of the weld profile geometry in the mathematical formulation. The shape of weld profile is discretized by a set of points that can be coincided with nodes in a finite element model. The Gaussian distribution function is modified in such a way that the heat density at a point inside the weld is proportional to the radial distance from the arc center to the weld profile point. Based on these assumptions, mathematical formulations are derived. The heat source model is determined from these mathematical formulations, and is used to determine distortions, residual stresses, and potential reductions in strength of the weld.

Other aspects, objects, and features of the present invention can be obtained from a study of the drawings, the disclosure, and the appended claims.

What is claimed is:

1. A method for determining a heat source model for a weld, including the steps of:

determining a double elliptical distribution of the heat density of the weld;

modifying the double elliptical distribution as a function of a profile geometry of the weld; and determining the heat source model as a function of the modified double elliptical distribution of the heat density.

2. A method, as set forth in claim 1, wherein the profile geometry of the weld is a function of the weld joint.

3. A method, as set forth in claim 2, wherein the weld joint is a butt joint.

4. A method, as set forth in claim 2, wherein the weld joint is a lap joint.

5. A method, as set forth in claim 2, wherein the weld joint is a T-fillet joint.

6. A method, as set forth in claim 1, wherein the double elliptical distribution of the heat density is a Gauss distribution.

7. A method, as set forth in claim 2, wherein the profile geometry of the weld is determined as a discrete number of points along the weld joint.

8. A method, as set forth in claim 7, including the step of correlating the discrete number of points with a set of nodes in a finite element model.

9. A method, as set forth in claim 1, further including the step of determining residual stresses and distortions of the weld as a function of the heat source model.

* * * * *